United States Patent
Gandham et al.

(10) Patent No.: US 8,274,955 B2
(45) Date of Patent: Sep. 25, 2012

(54) KEEP ALIVE TIMESLOTS IN A HETEROGENEOUS MAC PROTOCOL TO TRACK HANDSETS IN A WIRELESS NETWORK

(75) Inventors: Shashidhar R. Gandham, Sunrise, FL (US); Shih-Chun Chang, Sunrise, FL (US)

(73) Assignee: XG Technology, Inc., Sarasota, FL (US)

( * ) Notice: Subject to any disclaimer, the term of this patent is extended or adjusted under 35 U.S.C. 154(b) by 521 days.

(21) Appl. No.: 12/387,811

(22) Filed: May 7, 2009

(65) Prior Publication Data

US 2009/0310575 A1    Dec. 17, 2009

Related U.S. Application Data

(60) Provisional application No. 61/132,160, filed on Jun. 16, 2008.

(51) Int. Cl.
*H04J 3/00* (2006.01)
*H04H 20/71* (2008.01)
*H04W 4/00* (2009.01)

(52) U.S. Cl. ............. 370/337; 370/312; 455/422.1; 455/435.1

(58) Field of Classification Search .......... 370/337
See application file for complete search history.

(56) References Cited

U.S. PATENT DOCUMENTS

| | | | |
|---|---|---|---|
| 6,072,787 A * | 6/2000 | Hamalainen et al. | 370/335 |
| 6,201,974 B1 * | 3/2001 | Lietsalmi et al. | 455/466 |
| 6,487,183 B1 * | 11/2002 | Lo et al. | 370/326 |
| 7,106,779 B2 * | 9/2006 | Bender et al. | 375/130 |
| 7,564,840 B2 * | 7/2009 | Elliott et al. | 370/356 |
| 7,697,934 B2 * | 4/2010 | Vikberg et al. | 455/435.2 |
| 7,756,010 B2 * | 7/2010 | Ramanan et al. | 370/216 |
| 2002/0027894 A1 * | 3/2002 | Arrakoski et al. | 370/338 |
| 2002/0136169 A1 * | 9/2002 | Struhsaker et al. | 370/280 |
| 2002/0187788 A1 * | 12/2002 | McKay | 455/450 |
| 2003/0118049 A1 * | 6/2003 | Bender et al. | 370/466 |
| 2003/0133494 A1 * | 7/2003 | Bender et al. | 375/130 |
| 2003/0181217 A1 * | 9/2003 | Haas et al. | 455/522 |
| 2005/0210157 A1 * | 9/2005 | Sakoda | 709/251 |
| 2008/0049656 A1 * | 2/2008 | Kim | 370/312 |
| 2008/0279155 A1 * | 11/2008 | Pratt et al. | 370/336 |
| 2008/0316966 A1 * | 12/2008 | Joshi et al. | 370/330 |
| 2009/0059814 A1 * | 3/2009 | Nixon et al. | 370/254 |
| 2009/0067407 A1 * | 3/2009 | Jia et al. | 370/350 |

* cited by examiner

*Primary Examiner* — Guang Li
(74) *Attorney, Agent, or Firm* — Dennis L. Cook, Esq.

(57) ABSTRACT

This disclosure describes a new keep alive timeslots based method to track registered handsets for a MAC protocol that combines contention-free and contention-based MAC protocols into a heterogeneous MAC protocol used for forwarding VoIP traffic in VoIP systems on wireless networks using multiple base stations thus allowing for transmission of high bit-rate data to multiple users over wired and wireless means.

3 Claims, 4 Drawing Sheets

Example 1

| 0000  0000 | 1011 (11) | | 1010 (10) |
|---|---|---|---|
| 0100 (4) | 1000 (8) | 1011 (11) | 0011 (3) |
| 0001 (1) | 1100 (12) | 0010 (2) | 1111 (15) |
| 0100 (4) | 1101 (13) | | |

1. Starting Number = 11
2. Number of KATS = 10
3. Distance = 4 (bits)
4. 2nd KATS Number = 19 (11+8)
   3rd KATS Number = 30 (11+8+11)
   4th KATS Number = 33 (11+8+11+3)
   5th KATS Number = 34 (11+8+11+3+1)
   6th KATS Number = 46 (11+8+11+3+1+12)
   7th KATS Number = 48 (11+8+11+3+1+12+2)
   8th KATS Number = 63 (11+8+11+3+1+12+2+15)
   9th KATS Number = 67 (11+8+11+3+1+12+2+15+4)
   10th KATS Number = 80 (11+8+11+3+1+12+2+15+4+13)

Figure 1

Example 1

| 0000 0000 1011 (11) | | | 1010 (10) |
|---|---|---|---|
| 0100 (4) | 1000 (8) | 1011 (11) | 0011 (3) |
| 0001 (1) | 1100 (12) | 0010 (2) | 1111 (15) |
| 0100 (4) | 1101 (13) | | |

1. Starting Number = 11

2. Number of KATS = 10

3. Distance = 4 (bits)

4. 2nd KATS Number = 19 (11+8)

3rd KATS Number = 30 (11+8+11)

4th KATS Number = 33 (11+8+11+3)

5th KATS Number = 34 (11+8+11+3+1)

6th KATS Number = 46 (11+8+11+3+1+12)

7th KATS Number = 48 (11+8+11+3+1+12+2)

8th KATS Number = 63 (11+8+11+3+1+12+2+15)

9th KATS Number = 67 (11+8+11+3+1+12+2+15+4)

10th KATS Number = 80 (11+8+11+3+1+12+2+15+4+13)

Figure 2

Example 2

| 0101  1100  0011 (1475) | | | | | | 1010 (10) |
|---|---|---|---|---|---|---|
| 0010 (2) | 10(2) | 11(3) | 01(1) | 10(2) | 01(1) | 01(1) |
| 10(1) | 11(3) | 10(2) | | | | |

1. Starting Number = 1475

2. Number of KATS = 10

3. Distance = 2 (bits)

4. 2nd KATS Number = 1477 (1475+2)

3rd KATS Number = 1480 (1475+2+3)

4th KATS Number = 1481 (1475+2+3+1)

5th KATS Number = 1483 (1475+2+3+1+2)

6th KATS Number = 1484 (1475+2+3+1+2+1)

7th KATS Number = 1485 (1475+2+3+1+2+1+1)

8th KATS Number = 1486 (1475+2+3+1+2+1+1+1)

9th KATS Number = 1489 (1475+2+3+1+2+1+1+1+3)

10th KATS Number = 1491 (1475+2+3+1+2+1+1+1+3+2)

Figure 3

Example 3

| 0101  1100  0011 (1475) | | | | 1010 (10) | |
|---|---|---|---|---|---|
| 0011 (3) | 110(6) | 010(2) | 111(7) | 011(3) | |
| 111(7) | 101(5) | 100(4) | 011(3) | 001(1) | x |

1. Starting Number = 1475

2. Number of KATS = 10

3. Distance = 3 (bits)

4. 2nd KATS Number = 1481 (1475+6)

3rd KATS Number = 1483 (1475+6+2)

4th KATS Number = 1490 (1475+6+2+7)

5th KATS Number = 1493 (1475+6+2+7+3)

6th KATS Number = 1500 (1475+6+2+7+3+7)

7th KATS Number = 1505 (1475+6+2+7+3+7+5)

8th KATS Number = 1509 (1475+6+2+7+3+7+5+4)

9th KATS Number = 1512 (1475+6+2+7+3+7+5+4+3)

10th KATS Number = 1513 (1475+6+2+7+3+7+5+4+3+1)

Figure 4

Example 4

| 0101  1100  0011 (1475) | | | 1010 (10) | |
|---|---|---|---|---|
| 0101 (5) | 11000(24) | 01000(8) | | xx |
| 11101(29) | 10100(20) | 00110(6) | | x |
| 11001(25) | 00001(1) | 10000(16) | | x |
| 10110(22) | | | | | even a page number US 8,274,955 B2

KEEP ALIVE TIMESLOTS IN A HETEROGENEOUS MAC PROTOCOL TO TRACK HANDSETS IN A WIRELESS NETWORK

CROSS-REFERENCE TO RELATED APPLICATION

The present application claims the benefit of previously filed Provisional Patent Application Ser. No. 61/132,160.

FIELD OF THE INVENTION

This invention addresses the need to transport high bit-rate data and voice to multiple users over wired and wireless means. Specifically, this disclosure describes a keep alive timeslots based approach to track registered handsets for a MAC protocol that combines contention-free and contention-based MAC protocols for use in wireless VoIP systems with multiple base stations.

BACKGROUND OF THE INVENTION

The invention disclosed in this application uses any integer cycle or impulse type modulation and more particularly is designed to work with a method of modulation named Tri-State Integer Cycle Modulation (TICM) which has been previously disclosed in U.S. Pat. No. 7,003,047 issued Feb. 21, 2006 and is now known by its commercial designation, xMax. This new wireless physical layer technology developed by xG Technology Inc., referred to as xMAX, enables extremely low power omni-directional transmissions to be received in a wide area. Using xMAX, significant bandwidth can be made available for supporting various wireless applications. Voice Over IP (VoIP) based cellular services are now being developed using xMAX. In xMAX-based cellular networks both the base station and the handsets will be equipped with an xMAX transceiver. A mobile device (xMAX handset) in such a network will be free to move in an area covered by multiple xMAX base stations. Although the Heterogeneous MAC protocol for multiple base stations is disclosed in the preferred embodiment as being used in these types of integer cycle and pulse modulation systems it can be implemented on any broad band wireless technologies like WiMax, WiBro, WiFi, 3GPP and HSDPA, or any other type of wired or wireless voice or data systems.

A heterogeneous MAC protocol proposed to support VoIP traffic in xMAX wireless networks was described in the pending patent application by one of the inventors of this application, "Heterogeneous MAC Protocol For Forwarding VoIP Traffic On Wireless Networks", U.S. Ser. No. 12/069,057, the contents of which are included herein. In that application guaranteed timeslots are assigned to forward VoIP packets, temporary timeslots are assigned to forward data packets and contention based access is used to exchange control messages. That application described the MAC protocol in the context of a single base station providing metropolitan wide mobile VoIP service. There is a need to deploy multiple base stations such that coverage areas of adjacent base stations overlap. If each of the base stations were to operate independently then multiple concurrent transmissions in adjacent cells might interfere with each other. Hence, in a patent application "Heterogeneous MAC Protocol for Multiple Base Stations in Wireless Networks", U.S. Ser. No. 12/380,698, by some of the inventors of this application the MAC protocol was modified to support multiple base stations. In "Improved Heterogeneous MAC Protocol for Multiple Base Stations in a Wireless Network", U.S. Ser. No. 61/123,888, the contents of which are included herein, an improvement was disclosed to eliminate additional interference points. This application describes a keep alive timeslots based approach to track registered handsets for a MAC protocol that combines contention-free and contention-based MAC protocols for use in wireless VoIP systems with multiple base stations.

BRIEF SUMMARY OF THE INVENTION

The invention disclosed in this application was developed for and is described in the preferred embodiment as being used in any integer cycle or impulse type modulation and more particularly a method of modulation known by its commercial designation, xMax, but can be implemented on any broad band wireless technologies like WiMax, WiBro, WiFi, 3GPP and HSDPA, or any other type of wired or wireless voice or data systems. This disclosure describes a keep alive timeslots based approach to track registered handsets for a MAC protocol that combines contention-free and contention-based MAC protocols that reduces packet overhead for use in wireless VoIP systems with multiple base stations.

DESCRIPTION OF THE DRAWINGS

For a fuller understanding of the nature and objects of the invention, reference should be made to the accompanying drawings, in which:
FIG. 1 is an example showing superframe fields;
FIG. 2 is a second example showing superframe fields;
FIG. 3 is a third example showing superframe fields; and,
FIG. 4 is a fourth example showing superframe fields.

DETAILED DESCRIPTION OF THE INVENTION

The new wireless physical layer technology developed by xG Technology Inc., referred to as xMAX, enables extremely low power omni-directional transmissions to be received in a wide area. Using xMAX, significant bandwidth can be made available for supporting various wireless applications. Voice Over IP (VoIP) based cellular services are now being developed using xMAX. In xMAX-based cellular networks both the base station and the handsets will be equipped with an xMAX transceiver. A mobile device (xMAX handset) in such a network will be free to move in an area covered by multiple xMAX base stations.

In the preferred embodiment VoIP-based cellular network xMAX handsets (or mobile nodes) are equipped with the complete VoIP stack. The xMAX base station is connected to the Internet through an Ethernet port. The mobile nodes communicate with the xMAX base station to reach a VoIP gateway. To enable communication between an xMAX handset and multiple xMAX base stations one needs a MAC (Medium Access Control) protocol that is optimized for VoIP traffic and has reduced overhead.

A heterogeneous MAC protocol proposed to support VoIP traffic in xMAX wireless networks has been discussed in previously filed patent applications U.S. Ser. Nos. 12/069,057; 12/070,815; 61/123,875; 61/123,888; and, 61/125,696 which are incorporated by reference into this disclosure. In this heterogeneous MAC protocol, guaranteed timeslots are assigned to forward VoIP packets, temporary timeslots are assigned to forward data packets and contention based access is used to exchange control messages. Note that this heterogeneous MAC protocol is used here as a reference protocol and similarly xMAX as a reference wireless network. The idea of using keep alive timeslots can be used in other relevant systems.

When a handset running a heterogeneous MAC protocol is powered on it scans for base stations in its vicinity. On successfully identifying a base station the handset registers with the base station. The registration message is an indication to the base station that it needs to serve that particular handset. Every handset must send a keep alive message to inform the base station that it is still in its coverage area. Therefore, a keep alive timeslot (KATS) is reserved for this purpose. When a handset registers to a base station, the base station assigns it a KATS. In this application we disclose two algorithms for KATS assignment and keep alive transmission procedure—Static and Dynamic KATS. Static KATS is simple and yet efficient when the interval of successive keep alive messages from a handset is large whereas Dynamic KATS is useful if the interval needs to be small.

For each registered handset, the base station assigns a KATS between 0 and MAX_KATS_ID. The base station can keep track of KATS usage by maintaining a bitmap or an array. The base station does not allow new handsets to register if there exists MAX_REGISTRATION_PER_CHANNEL handsets in one channel. In the registration reply, the base station includes the KATS that has been assigned for that handset. After sending the Network Join message, a handset keeps waiting for both beacon and CDT in subsequent superframes until it receive a registration reply. Upon receiving the beacon and KATS in the registration reply, the handset can deduce the super-frame in which it should send a KeepAlive message. Specifically, the handset computes:

current_$bts$_kats_number=(HyperFrame_$num$*18+ SuperFrame_$num$)% 6000;

local_kats_number=current_bts_kats_number;

In each super-frame, the handset increments the local_kats_number value (which will be reset to 0 if it reaches MAX_KATS_ID). If the local_kats_number value equals to its KATS received from the base station, the handset sends a KeepAlive message in the KeepAlive timeslot to the base station. For example, suppose the handset receives a KATS of 275 and the information in the beacon shows that HF=10, SF=15. Then, current_$bts$_kats_number=(10*18+15)%6000=195;

local_kats_number=current_$bts$_kats_number=195;

Based on this information, in next 275−195=80 super-frames, the handset sends the first KeepAlive message. After that, it sends the KeepAlive message in every MAX_KATS_ID super-frames. However, before sending the KeepAlive message, the handset might need to check the hyper-frame and super-frame number to make sure that its KATS matches that of the base station.

Since there are no more MAX_REGISTRATION_PER_CHANNEL handsets being assigned a KATS, then for every MAX_KATS_ID super-frames, there are some without a KATS. Thus, the base station can announce this in the CDT so that the handsets can use this KATS as a CBA timeslot.

If the base station does not receive a KeepAlive message from a handset for 8 consecutive times, it de-registers the handset from the network.

In dynamic KATS, to have more flexibility, we adjust KATS dynamically, including the number of KATS and the starting timeslot number in a superframe. Information regarding KATS will be announced in the CDT. For example, if the number of registered handsets is low, say 100, and the interval between successive keep alive messages of a handset is 3 seconds, then we can allow one KATS per superframe. If there are 1000 registered handsets, we can adjust to allow 10 KATS per superframe. Information regarding KATS can be added to other control elements or a new control element. A control element for KATS may look like the following format:

Control Element=KATS/*Indicate it is KATS information*/

NUMBER of KATS=10/*There are 10 KATS in the current superframe*/

START NUMBER=456/*The handset who has timeslot number 456 will send keep alive first. Therefore in this case, 456 to 465 will transmit.*/

Fragmentation of KATS is something that happens when the number of registered handsets decreases. Suppose there are 100 registered handsets, 1-100 KATS are assigned to handsets. After a while, some handsets leave the network; thus the corresponding KATS, say 5-50, are free. Since no handsets use KATS 5-50, those timeslots are wasted if the base station still keeps them in the superframe. The following approach is used to address this issue:

1. Skipping Announcement: If there are unoccupied KATS, the base station will skip those KATS numbers and jump directly to the next occupied one in the CDT announcement.

The size of a group can be a multiple of the maximum number of KATS in a superframe. However, the size of the group may also adjust dynamically Below is the format of control elements for KATS:
1. Starting Number (12 bits)
2. Number of KATS (4 bits)
3. Distance (4 bit)
4. Next KATS Number (various bits)

Field 1 indicates the first KATS number in that superframe. In other words, a handset that has the starting number will send a keep alive message in the first KATS. Since it has 12 bits, there can be 4096 unique numbers. Field 2 denotes the number of KATS in that superframe. Field 4 is the differential value of the KATS number and the previous one. For example, if the Starting Number is 10, and the next KATS Number is 5, a handset that has KATS number 15 will send the keep alive message in the second KATS. There can be multiple instances of Field 4 depending on Field 2. Field 3 is the maximum distance between successive KATS numbers. If Distance is 4, the difference between successive KATS numbers is at most 4 bits (See examples 1 and 2 in FIGS. 1 and 2).

In multiple instances where Field 4 cannot fit into or occupy exactly 2 bytes, the remaining bits of that 2-byte chunk are not used (See examples 3 and 4 in FIGS. 3 and 4).

Thus what has been disclosed in this application is a method based on handsets sending keep alive messages in pre-assigned timeslots. This KATS based method is used to keep track of active handsets in each cell of a mobile wireless system.

Since certain changes may be made in the above described keep alive timeslots based approach to track registered handsets for a MAC protocol for use in VoIP systems without departing from the scope of the invention herein involved it is intended that all matter contained in the description thereof, or shown in the accompanying figures, shall be interpreted as illustrative and not in a limiting sense.

What is claimed is:

1. A method of scheduling of keep alive messages using keep alive timeslots in a medium access control protocol having hyperframes made up of superframes containing headers and time slots dedicated to keep alive messages used for forwarding Internet Protocol packets and keep alive messages on a communications channel between a base station and nodes in voice over the Internet protocol systems on a wired or wireless network comprising:

first a base station storing and assigning a different keep alive time slot to each node in wired or wireless communication with said base station up to a maximum number of keep alive time slots wherein said maximum number of said keep alive timeslots is less than a set maximum number of superframes within a hyperframe, which set maximum number of superframes is based on the maximum number of nodes capable of being serviced by said base station's communications channel;

then said base station transmitting and said node receiving said assigned keep alive timeslot during an identified hyperframe number and an identified superframe number, and then said node computing a computed timeslot number based on said assigned keep alive timeslot, said identified hyperframe number, and said identified superframe number;

said node then incrementing said computed timeslot number by one for each subsequent superframe and then sending a first keep alive message during a superframe when said computed timeslot number equals said assigned keep alive timeslot;

then said node sending additional keep alive messages only during superframes that come after the number of superframes received by said node after said node's last sent keep alive message equals the maximum number of keep alive timeslots: and, then some of said keep alive timeslots being used for other messages when not sending keep alive messages.

2. The method of scheduling of keep alive messages using keep alive timeslots of claim 1 wherein a control element contained in said header is used to dynamically adjust said keep alive timeslots.

3. The method of scheduling of keep alive messages using keep alive timeslots of claim 1 wherein a skipping announcement contained in said header is used to skip said keep alive timeslots that are no longer being used.

* * * * *